(12) United States Patent
Chung et al.

(10) Patent No.: US 9,217,894 B2
(45) Date of Patent: Dec. 22, 2015

(54) BACKLIGHT ASSEMBLY AND DISPLAY APPARATUS HAVING THE SAME

(75) Inventors: Seung-Hwan Chung, Chungcheongnam-do (KR); Cheol-Yong Noh, Chungcheongnam-do (KR); Kwang-Jin Jeong, Chungcheongnam-do (KR); Eui-Jeong Kang, Chungcheongnam-do (KR); Youn-Ho Han, Chungcheongnam-do (KR); Jae-Suk Yoo, Seoul (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 375 days.

(21) Appl. No.: 13/443,501

(22) Filed: Apr. 10, 2012

(65) Prior Publication Data

US 2013/0044509 A1    Feb. 21, 2013

(30) Foreign Application Priority Data

Aug. 16, 2011 (KR) ................. 10-2001-0081268

(51) Int. Cl.
*G02B 6/00* (2006.01)
*G02F 1/1335* (2006.01)
*F21V 8/00* (2006.01)

(52) U.S. Cl.
CPC ........ *G02F 1/133606* (2013.01); *G02B 6/0013* (2013.01); *G02B 6/0078* (2013.01); *G02B 6/0051* (2013.01); *G02B 6/0068* (2013.01); *G02F 1/133611* (2013.01); *G02F 1/133615* (2013.01); *G02F 2001/133601* (2013.01)

(58) Field of Classification Search
CPC .................................... G02B 6/0078

USPC .................................. 362/602, 613
See application file for complete search history.

(56) References Cited

U.S. PATENT DOCUMENTS 7,632,002 B1    12/2009  Park et al.
8,047,669 B2 *  11/2011  Bourdelais et al. .......... 362/97.3
8,388,212 B2 *   3/2013  Baek et al. .................... 362/634

(Continued)

FOREIGN PATENT DOCUMENTS

CN    101324725    12/2008
CN    101329472    12/2008

(Continued)

OTHER PUBLICATIONS

EPO Search Report dated Mar. 12, 2013 in corresponding European Patent Application No. 12 16 1978.7.

(Continued)

*Primary Examiner* — Thomas A Hollweg
*Assistant Examiner* — Christopher Raabe
(74) *Attorney, Agent, or Firm* — F. Chau & Associates, LLC

(57) ABSTRACT

A backlight assembly includes a first light guide plate, a second light guide plate, a light source part and a cover part. The second light guide plate is spaced apart from the first light guide plate. The light source part includes a first light source providing light to the first light guide plate and a second light source providing light to the second light guide plate. The cover part is disposed over the light source part. The cover part overlaps with a portion of the first light guide plate and a portion of the second light guide plate. A display apparatus having the above configuration has a narrow bezel and a thin profile.

38 Claims, 9 Drawing Sheets

(56) References Cited

U.S. PATENT DOCUMENTS

| | | | |
|---|---|---|---|
| 8,523,420 B2* | 9/2013 | Baek et al. | 362/616 |
| 8,602,581 B1* | 12/2013 | Kaihotsu | 362/97.2 |
| 2004/0183962 A1* | 9/2004 | Hua-Nan et al. | 349/64 |
| 2006/0114690 A1* | 6/2006 | Iki et al. | 362/612 |
| 2006/0262564 A1* | 11/2006 | Baba | 362/616 |
| 2007/0165419 A1 | 7/2007 | Horiuchi et al. | |
| 2007/0171678 A1* | 7/2007 | Shim et al. | 362/616 |
| 2008/0101068 A1 | 5/2008 | Kitamura et al. | |
| 2010/0053506 A1* | 3/2010 | Bae et al. | 349/69 |
| 2010/0060818 A1 | 3/2010 | Ajichi et al. | |
| 2010/0265432 A1 | 10/2010 | Masuda et al. | |
| 2011/0001899 A1* | 1/2011 | Ajichi et al. | 349/62 |
| 2011/0013098 A1 | 1/2011 | Jung et al. | |
| 2012/0262645 A1* | 10/2012 | Li et al. | 349/64 |
| 2012/0262942 A1* | 10/2012 | Yu et al. | 362/609 |

FOREIGN PATENT DOCUMENTS

| | | |
|---|---|---|
| EP | 2241800 | 10/2010 |
| EP | 2299161 | 3/2011 |
| EP | 2312660 | 4/2011 |
| JP | 2009-186525 | 2/2009 |
| JP | 2010-277712 | 12/2010 |
| KR | 1020110085126 | 7/2011 |
| WO | 2011074410 | 6/2011 |

OTHER PUBLICATIONS

European Search Report in corresponding European Patent Application No. 14170860.2 dated Sep. 3, 2014.

Chinese Office Action Dated Sep. 29, 2015.

* cited by examiner

BACKLIGHT ASSEMBLY AND DISPLAY APPARATUS HAVING THE SAME

CROSS-REFERENCE TO RELATED APPLICATION

This application claims priority to Korean Patent Application No. 2011-81268, filed on Aug. 16, 2011, and all the benefits accruing therefrom under 35 U.S.C. §119, the contents of which are herein incorporated by reference in their entireties.

BACKGROUND OF THE INVENTION

1. Technical Field

Exemplary embodiments of the present invention relate to a backlight assembly and a display apparatus having the backlight assembly. More particularly, exemplary embodiments of the present invention relate to a backlight assembly having a narrow bezel and a thin profile and a display apparatus having the backlight assembly.

2. Discussion of the Related Art

Liquid crystal display apparatuses having a thin profile, light weight and low power consumption have been used as monitors, for laptop computers, cellular phones, televisions and so on. A liquid crystal display apparatus includes a liquid crystal display panel displaying an image using light transmittance of liquid crystal and a backlight assembly disposed under a liquid crystal display panel to provide light to the liquid crystal display panel.

A backlight assembly includes a plurality of light sources generating light required to display an image on the liquid crystal display panel. For example, the light sources may include a cold cathode fluorescent lamp ("CCFL"), an external electrode fluorescent lamp ("EEFL"), a flat fluorescent lamp ("FFL"), and light emitting diodes ("LEDs").

A backlight assembly may be classified as a direct-illumination type or as an edge-illumination type. In the direct-illumination type backlight assembly, the light sources are disposed under the liquid crystal display panel corresponding to an entire area of the liquid crystal display panel. Thus, a display apparatus having the direct-illumination type backlight assembly may have a relatively narrow bezel. However, a display apparatus having the direct-illumination type backlight assembly may be relatively thick.

In an edge-illumination type backlight assembly, the light sources are disposed under the liquid crystal display panel at a position corresponding to an edge portion of the liquid crystal display panel. Thus, the display apparatus having the edge-illumination type backlight assembly may be relatively thin. However, the display apparatus having the edge-illumination type backlight assembly may have a relatively wide bezel.

SUMMARY OF THE INVENTION

Exemplary embodiments of the present invention provide a backlight assembly having a light source part disposed corresponding to a central portion of a display panel so that a display apparatus may have a narrow bezel and may be thin.

Exemplary embodiments of the present invention also provide a display apparatus including the backlight assembly.

A backlight assembly, according to an embodiment of the present invention, includes a first light guide plate, a second light guide plate, a light source part and a cover part. The second light guide plate is spaced apart from the first light guide plate. The light source part includes a first light source facing and providing light to the first light guide plate and a second light source facing and providing light to the second light guide plate. The cover part is disposed over the light source part. The cover part is overlaps with a portion of the first light guide plate and a portion of the second light guide plate.

In an exemplary embodiment, an upper surface of the first light guide plate may include a first portion having a first height and a second portion having a second height less than the first height, wherein the second portion is adjacent to the first light source. An upper surface of the second light guide plate may include a first portion having the first height and a second portion having the second height less than the first height, wherein the second portion of the second light guide plate is adjacent to the second light source.

In an exemplary embodiment, the second portion of the first light guide plate may include an inclined portion having a height gradually decreasing as the inclined portion of the first light guide plate gets closer to the first light source. The second portion of the second light guide plate may include an inclined portion having a height gradually decreasing as the inclined portion of the second light guide plate gets closer to the second light source.

In an exemplary embodiment, a height of an upper surface of the cover part may be substantially equal to or less than the first height.

In an exemplary embodiment, a width of the upper surface of the cover part in a first direction may be substantially equal to or less than a distance of a gap between a boundary of the first and second portions of the first light guide plate and a boundary of the first and second portions of the second light guide plate in the first direction.

In an exemplary embodiment, side surfaces of the cover part may have a shape corresponding to the second portion of the first light guide plate and the second portion of the second light guide plate, respectively.

In an exemplary embodiment, a first side surface of the cover part may include a first inclined portion corresponding to the inclined portion of the first light guide plate and a second side surface of the cover part may include a second inclined portion corresponding to the inclined portion of the second light guide plate.

In an exemplary embodiment, the backlight assembly may further include a printed sheet disposed between the light source part and the cover part and including printed patterns on the printed sheet.

In an exemplary embodiment, a size of each of the printed patterns or a density of the printed patterns may decrease as a distance of the printed patterns from the first and second light sources increases.

In an exemplary embodiment, the printed patterns may include first patterns having a first brightness and second patterns having a second brightness. The first patterns may be disposed adjacent to the first and second light sources. The second patterns may be disposed farther than the first patterns from the first and second light sources.

In an exemplary embodiment, the first brightness may be less than the second brightness.

In an exemplary embodiment, the first patterns may be gray. The second patterns may be white.

In an exemplary embodiment, the backlight assembly may further include a printed sheet disposed on the cover part and including printed patterns on the printed sheet.

In an exemplary embodiment, a size of each of the printed patterns or a density of the printed patterns may decrease as a distance of the printed patterns from the first and second light sources increases In an exemplary embodiment, the printed patterns may include first patterns having a first brightness and second patterns having a second brightness. The first patterns may be disposed adjacent to the first and second light sources. The second patterns may be disposed farther than the first patterns from the first and second light sources.

In an exemplary embodiment, the first brightness may be less than the second brightness.

In an exemplary embodiment, the first patterns may be gray. The second patterns may be white.

In an exemplary embodiment, the backlight assembly may further include a first printed sheet disposed between the light source part and the cover part and including first patterns on the first printed sheet and a second printed sheet disposed on the cover part and including second patterns on the second printed sheet.

In an exemplary embodiment, a size of each of the first and second patterns or a density of the first and second patterns may decrease as a distant of the printed patterns from the first and second light sources increases.

In an exemplary embodiment, the first patterns may include a gray pattern and a white pattern. The second patterns may be white.

In an exemplary embodiment, the cover part may include a material that diffuses light.

In an exemplary embodiment, a surface of the cover part may have a concavo-convex pattern.

In an exemplary embodiment, the first light source may include a plurality of first point light sources disposed in a first row. The second light source may include a plurality of second point light sources disposed in a second row substantially parallel to the first row.

In an exemplary embodiment, the first point light sources may respectively face the second point light sources.

In an exemplary embodiment, each of the first point light sources and each of the second point light sources may be alternately disposed with each other.

In an exemplary embodiment, the light source part may further include a printed circuit board on which the first light source and the second light source are fixed. The printed circuit board may include a first fixing portion. The cover part may include a second fixing portion. The cover part may be fixed to the light source part by the first and second fixing portions.

In an exemplary embodiment, the first fixing portion may be a hole. The second fixing portion may be a protrusion extending toward the printed circuit board. The first fixing portion may be combined with the second fixing portion by a screw A display apparatus, according to an exemplary embodiment of the present invention, includes a display panel and a backlight assembly. The display panel displays an image. The backlight assembly is disposed under the display panel. The backlight assembly includes a first light guide plate, a second light guide plate, a light source part and a cover part. The second light guide plate is spaced apart from the first light guide plate. The light source part includes a first light source facing and providing light to the first light guide plate and a second light source facing and providing light to the second light guide plate. The cover part overlaps with a portion of the first light guide plate and a portion of the second light guide plate.

A backlight assembly, according to an embodiment of the present invention, comprises a first light guide plate, a second light guide plate spaced apart from the first light guide plate, a light source disposed between the first light guide plate and the second light guide plate, and a cover part disposed over the light source, and overlapping with a portion of the first light guide plate and a portion of the second light guide plate, wherein the cover part diffuses light from the light source.

The cover part may be disposed in a recess formed by parts of the first and second light guide plates.

A top surface of the cover part may be substantially level with or below a top surface of each of the first and second light guide plates.

The backlight assembly may further comprise a sheet including patterns for absorbing and reflecting light positioned over the light source.

The sheet may be positioned between the cover part and the light source.

The sheet may be positioned on a top surface of the cover part.

According to the backlight assembly and the display apparatus including the backlight assembly, the light source part is disposed corresponding to a central portion of a display panel so that a display apparatus may have a narrow bezel and may be thin.

In addition, a cover part diffusing light from the light source part is disposed over the light source part so that light may be prevented from leaking between the light source part and a light guiding plate, and a luminance uniformity of the display panel may be improved.

In addition, a printed sheet reflecting and absorbing light from the light source part is disposed over the light source part so that a luminance uniformity of the display panel may be improved.

BRIEF DESCRIPTION OF THE DRAWINGS

Features of the present invention will become more apparent by describing in detailed exemplary embodiments thereof with reference to the accompanying drawings, in which.

DETAILED DESCRIPTION OF EMBODIMENTS OF THE INVENTION

Hereinafter, embodiments of the present invention will be explained in detail with reference to the accompanying drawings.

Figure 1:
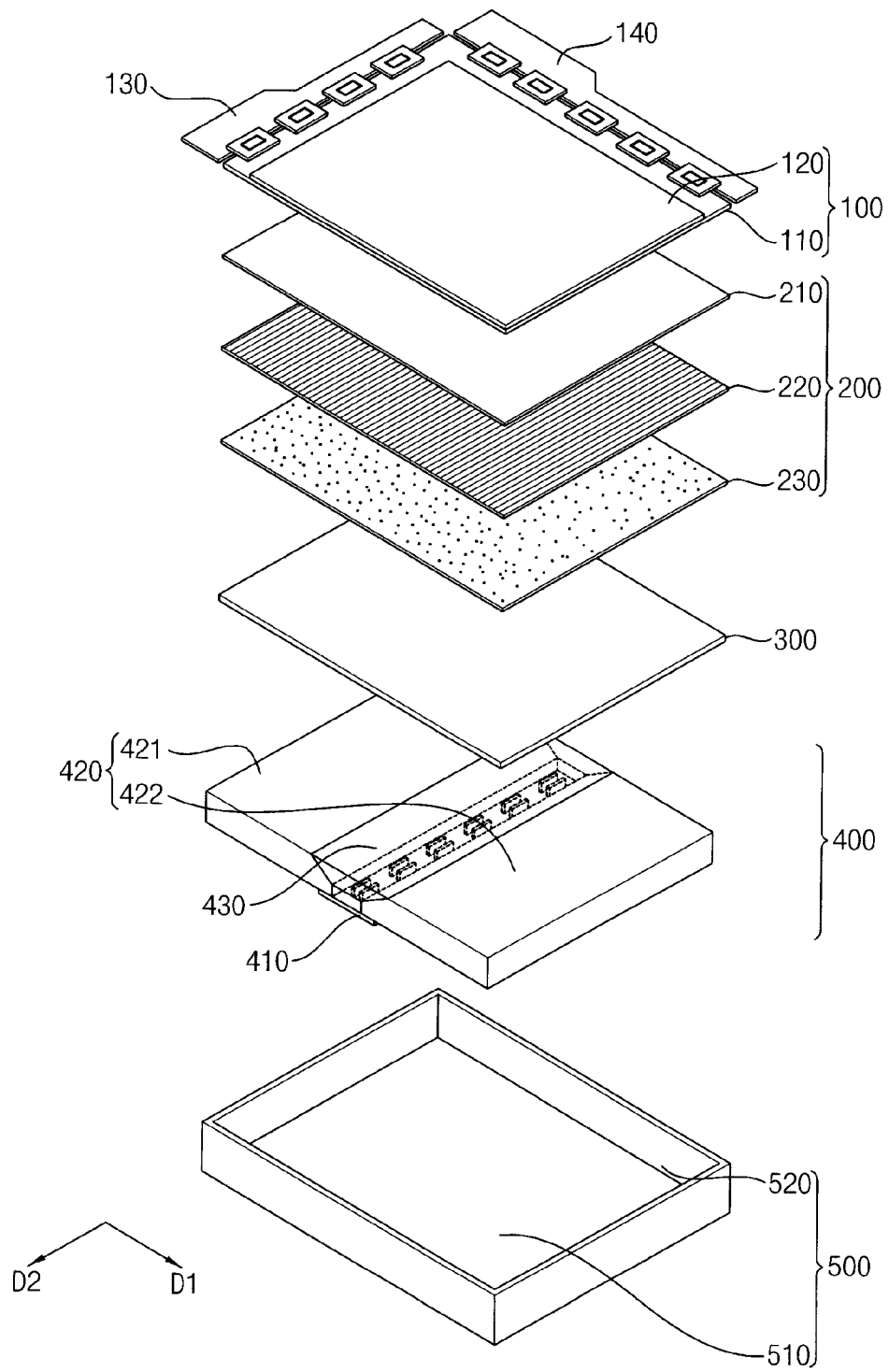
FIG. 1 is an exploded perspective view illustrating a display apparatus according to an exemplary embodiment of the present invention.

FIG. 1 is an exploded perspective view illustrating a display apparatus including a backlight assembly according to an exemplary embodiment of the present invention.

Referring to FIG. 1, the display apparatus includes a display panel 100, an optical sheet part 200, a diffusion plate 300, a backlight assembly 400 and a receiving container 500.

The display panel 100 displays an image. The display panel 100 includes a first substrate 110, a second substrate 120, a liquid crystal layer (not shown in figures), a gate driver 130 and a data driver 140.

The first substrate 110 may be a thin film transistor ("TFT") substrate on which a TFT is formed. The second substrate 120 faces the first substrate 110. According to an embodiment, the second substrate 120 is a color filter substrate on which a color filter is formed. The liquid crystal layer (not shown) is disposed between the first and second substrates 110 and 120.

The gate driver 130 and the data driver 140 are connected to the first substrate 110 to output driving signals to the first substrate 110. According to an embodiment, the gate and data drivers 130 and 140 respectively include a flexible printed circuit ("FPC"), a driving chip mounted on the FPC, and a printed circuit board ("PCB") connected to the FPC.

The display panel 100 has a rectangular shape having a long side and a short side. The long side of the display panel 100 is substantially parallel to a first direction DE and the short side of the display panel 100 is substantially parallel to a second direction D2 crossing the first direction D1.

The optical sheet part 200 includes a plurality of sheets. The optical sheet part 200 includes, for example, a dual brightness enhancement film ("DBEF") 210, a prism sheet 220, a diffusion sheet 230.

The DBEF 210 is disposed on the prism sheet 220. The DBEF 210 enhances a luminance of light passing through the prism sheet 220.

The prism sheet 220 includes a plurality of prisms disposed with uniform gaps between the prisms. According to an embodiment, each of the prisms has a triangular prism shape. The prism sheet 220 condenses light diffused by the diffusion sheet 230 in a direction substantially perpendicular to a plane of the display panel 100. The optical sheet part 200 may further include a protecting sheet (not shown) disposed between the DBEF 210 and the prism sheet 220 to protect the prism sheet 220 from damage, such as scratches. According to an embodiment, the optical sheet part 200 may include a plurality of prism sheets 220.

The diffusion sheet 230 includes a base substrate and a coating layer disposed on the base substrate. According to an embodiment, the coating layer includes a plurality of beads, each of the beads having a globular shape. The diffusion sheet 230 diffuses light passing through the diffusion plate 300 so that luminance uniformity may be improved. For example, the optical sheet part 200 may include a plurality of diffusion sheets 230.

Although not shown in figures, the optical sheet part 200 may include additional sheets. Alternatively, at least one of the DBEF 210, the prism sheet 220 and the diffusion sheet 230 may be omitted.

The diffusion plate 300 diffuses light provided from the backlight assembly 400, and transmits the light to the optical sheet part 200.

The backlight assembly 400 includes a light source part 410, a light guide plate 420 and a cover part 430.

The light source part 410 is disposed at a position corresponding to a central portion of the display panel 100 with respect to the first direction D1. The light source part 410 includes a plurality of point light sources. The light source part 410 generates light, and transmits the light to the light guide plate 420.

Although, the light source part 410 is disposed at a position corresponding to the central portion of the display panel 100 with respect to the first direction D1 in the present exemplary embodiment, according to an alternative embodiment, the light source part 410 is disposed at a position corresponding to a central portion of the display panel 100 with respect to the second direction D2.

The light guide plate 420 includes a first light guide plate 421 and a second light guide plate 422 spaced apart from the first light guide plate 421. For example, the first light guide plate 421 is disposed adjacent to a first side of the light source part 410, and the second light guide plate 422 is disposed adjacent to a second side of the light source part 410 opposite to the first side. The first light guide plate 421 and the second light guide plate 422 guide light generated from the light source part 410 to the display panel 100.

The cover part 430 is disposed over the light source part 410. According to an embodiment, the cover part 430 overlaps a portion of the first light guide plate 421 and/or a portion of the second light guide plate 422.

Figure 2:
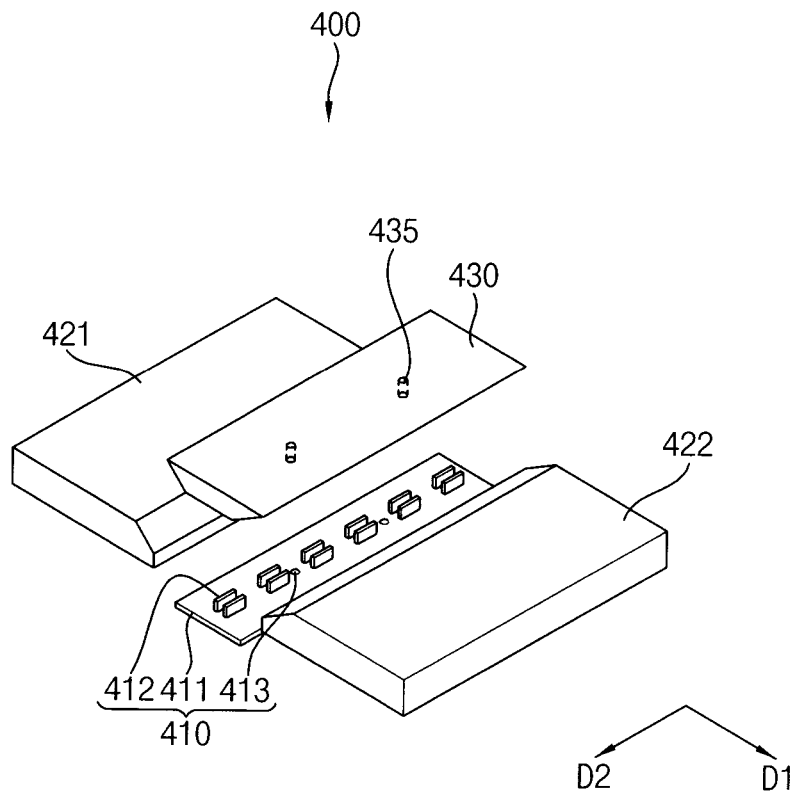
FIG. 2 is an exploded perspective view illustrating a backlight assembly of FIG. 1.
Figure 3:
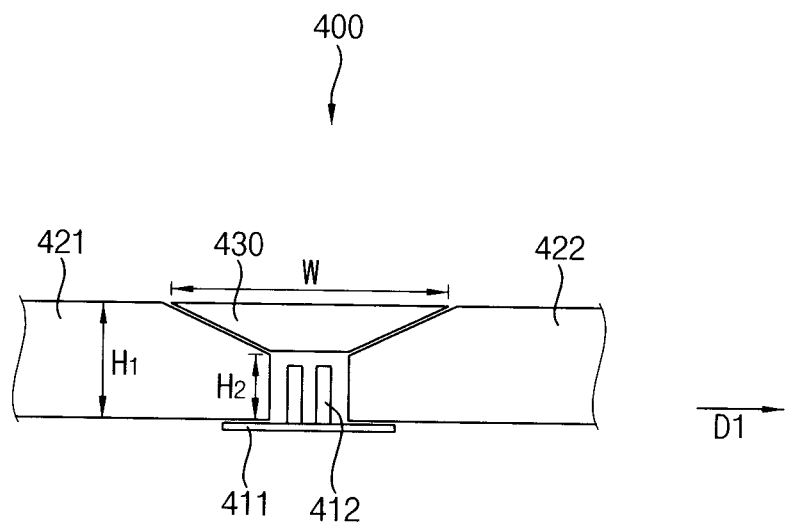
FIG. 3 is a cross-sectional view illustrating the backlight assembly of FIG. 1 taken along a first direction D1.

The light source part 410, the light guide plate 420 and the cover part 430 are explained in further detail referring to FIGS. 2 and 3.

Although not shown in figures, the backlight assembly 400 further includes a light source driver driving the light source part 410. The light source driver faces a rear surface of a bottom plate of the receiving container 500.

The receiving container 500 is disposed under the backlight assembly 400. The receiving container 500 receives the display panel 100, the optical sheet part 200, the diffusion plate 300 and the backlight assembly 400.

The receiving container 500 includes a bottom plate 510 and a side wall 520 extended from the bottom plate 510.

Although not shown in figures, the display apparatus may further include a reflecting plate disposed between the backlight assembly 400 and the receiving container 500.

Although not shown in figures, the display apparatus may further include a top chassis disposed on the display panel 100 and combined with the receiving container 500 and a mold frame increasing the rigidity of the combination of elements forming the display apparatus.

FIG. 2 is an exploded perspective view illustrating the backlight assembly 400 of FIG. 1.

FIG. 3 is a cross-sectional view illustrating the backlight assembly 400 of FIG. 1 taken along the first direction D1.

Referring to FIGS. 1 to 3, the backlight assembly 400 includes the light source part 410, the first light guide plate 421, the second light guide plate 422 and the cover part 430.

The light source part 410 includes a printed circuit board 411, a plurality of light sources 412 and a first fixing portion 413.

The light sources 412 are fixed to the printed circuit board 411. The printed circuit board 411 includes wiring applying a driving signal to the light sources 412. Although not shown in figures, the printed circuit board 411 is connected to the light source driver.

The light source part 410 includes a first light source and a second light source. The first light source is disposed adjacent to the first light guide plate 421. The first light source generates light and transmits the light to the first light guide plate 421. The second light source is disposed adjacent to the second light guide plate 422. The second light source generates light and transmits the light to the second light guide plate 422.

The light sources 412 are disposed in a plurality of rows. For example, the light sources 412 are disposed in two rows along the second direction D2. The first light source is disposed in a first row. The second light source is disposed in a second row substantially parallel to the first row. The light sources 412 protrude from the printed circuit board 411 in a direction substantially perpendicular to a plane of the printed circuit board 411.

The first light source includes a plurality of first point light sources. The second light source includes a plurality of second point light sources. The first point light sources are positioned to respectively face the second point light sources.

The first fixing portion 413 is disposed on the printed circuit board 411. The first fixing portion 413 is combined with a second fixing portion 435 of the cover part 430. According to an embodiment, the first fixing portion 413 is a hole, and is combined with the second fixing portion 435 using a screw (not shown).

The first fixing portion 413 is disposed at an area where the first and second point light sources are not disposed. A plurality of the first fixing portions 413 may be disposed on the printed circuit board 411.

The first light guide plate 421 is disposed in a direction opposite to the first direction D1 with respect to the light source part 410. The first light guide plate 421 faces the first light source. The first light guide plate 421 guides the light generated from the first light source to the display panel 100.

The first light guide plate 421 includes a first portion having a first height $H_1$ and a second portion having a second height $H_2$ lower than the first height. The second portion is adjacent to the first light source.

According to an embodiment, the second portion of the first light guide plate 421 includes an inclined portion having a height gradually decreasing as the inclined portion is closer to the first light source. Alternatively, the second portion of the first light guide plate 421 may have various shapes, such as, for example, a stepped portion decreasing in height from a first height to a lower second height closer to the first light source.

The second light source plate 422 is spaced apart from the first light guide plate 421. The second light guide plate 422 is disposed in the first direction D1 with respect to the light source part 410. The second light guide plate 422 faces the second light source. The second light guide plate 422 guides light generated from the second light source to the display panel 100.

Similar to the first light guide plate 421, an upper surface of the second light guide plate 422 includes a first portion having the first height and a second portion having the second height lower than the first height. The second portion is adjacent to the second light source.

According to an embodiment, the second portion of the second light guide plate 422 includes an inclined portion having a height gradually decreasing as the inclined portion is closer to the second light source. Alternatively, the second portion of the second light guide plate 422 may have various shapes, such as, for example, a stepped portion decreasing in height from a first height to a lower second height closer to the second light source.

The cover part 430 is disposed over the light source part 410. The cover part 430 includes a portion overlapping with a portion of the first light guide plate 421 and a portion overlapping with a portion of the second light guide plate 422.

The cover part 430 includes an upper surface, a lower surface and side surfaces connecting the upper surface and the lower surface. According to an embodiment, a cross section of the cover part 430 in the first direction D1 has a trapezoidal shape.

The cover part 430 is received in a recess portion defined by the second portion of the first light guide plate 421 and the second portion of the second light guide plate 422. Referring to FIGS. 2 and 3, the recess portion is defined by the inclines of the first and second portions of the light guide plates 421, 422.

A height of an upper surface of the cover part 430 is substantially equal to or less than the first height $H_1$. Thus, the upper surface of the cover part 430 does not protrude from the upper surfaces of the first and second light guide plates 421 and 422. Therefore, a thickness of the backlight assembly 400 is not increased by the cover part 430.

A width W of the upper surface of the cover part 430 in the first direction D1 is substantially equal to or less than a gap between an end of the inclined portion of the first light guide plate 421 and an end of the inclined portion of the second light guide plate 422. The width may also be described as a gap between a boundary of the first and second portions of the first light guide plate and a boundary of the first and second portions of the second light guide plate in the first direction. According to an embodiment, the width of the upper surface of the cover part 430 in the first direction D1 is between about 10 mm and about 100 mm.

The side surfaces of the cover part 430 have a shape corresponding to the second portion of the first light guide plate 421 and the second portion of the second light guide plate 422. For example, a first side surface of the cover part 430 includes a first inclined portion corresponding to the inclined portion of the first light guide plate 421, and a second side surface of the cover part 430 includes a second inclined portion corresponding to the inclined portion of the second light guide plate 422.

The cover part 430 diffuses the light irradiated in an upper direction from the light source part 410 toward the first and second light guide plates 421 and 422. Alternatively, the cover part 430 diffuses the light irradiated in an upper direction from the light source part 410 toward the diffusion plate 300. Thus, the central portion of the display panel 100 corresponding to the light source part 410 is not brighter than other portions of the display panel so that a luminance uniformity of the display panel 100 may be improved.

The cover part 430 includes one of polycarbonate ("PC") and polymethylmetacrylate ("PMMA") or a mixture thereof. The cover part 430 may include a diffusion material.

According to an embodiment, the cover part 430 has a haze value substantially equal to or greater than 90%. The haze value is a ratio of scattered light to entire incident light. According to an embodiment, the cover part 430 has a transmitting ratio substantially equal to or less than about 90%.

Although not shown in figures, according to an embodiment, a surface of the cover part 430 includes a light scattering pattern. The light scattering pattern may be, for example, a concavo-convex pattern. The concavo-convex pattern may have a maximum surface roughness between about 0.1 μm and about 100 μm.

According to an embodiment, the cover part 430 is fixed at the printed circuit board 411 of the light source part 410. The cover part 430 includes the second fixing portion 435 corresponding to the first fixing portion 413 of the light source part 410. The second fixing portion 435 may be, for example, a protrusion extending to the first fixing portion 413.

According to the present exemplary embodiment, the light source part 410 is disposed corresponding to the central portion of the display panel 100 so that the display apparatus has a narrow bezel and a thin profile.

The cover part 430 diffusing light from the light source part 410 is disposed over the light source part 410 so that light is prevented from leaking between the light source part 410 and the light guiding plate 420, and a luminance uniformity of the display panel 100 is improved.

The second portion of the first light guide plate 421 and the second portion of the second light guide plate 422 (e.g., the inclined portions) define a recess portion, and the cover part 430 is received in the recess portion so that a thickness of the display apparatus is not increased by the cover part 430.

Figure 4:
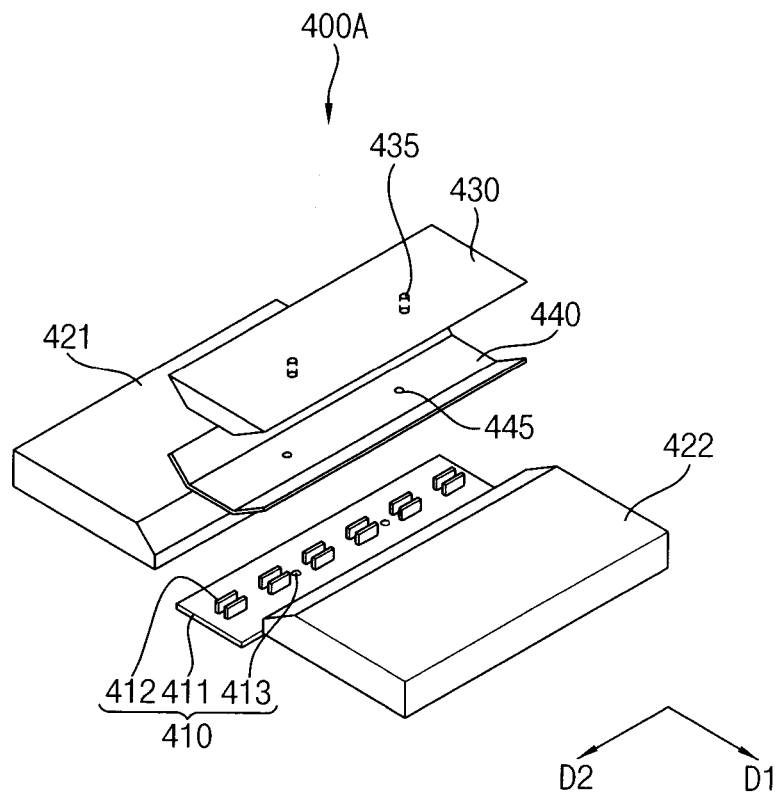
FIG. 4 is an exploded perspective view illustrating a backlight assembly according to an exemplary embodiment of the present invention.
Figure 5:
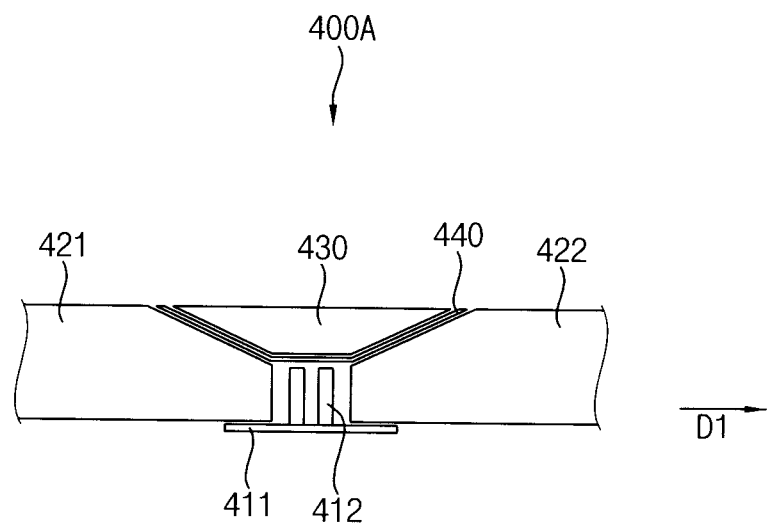
FIG. 5 is a cross-sectional view illustrating the backlight assembly of FIG. 4 taken along the first direction D1.

FIG. 4 is an exploded perspective view illustrating a backlight assembly 400A according to an exemplary embodiment of the present invention. FIG. 5 is a cross-sectional view illustrating the backlight assembly 400A of FIG. 4 taken along the first direction.

A display apparatus according to the present exemplary embodiment is substantially the same as the display apparatus of the previous exemplary embodiment explained referring to FIGS. 1 to 3 except that the backlight assembly further includes a printed sheet. Thus, the same reference numerals will be used to refer to the same or like parts as those described in the previous exemplary embodiment of FIGS. 1 to 3.

Referring to FIGS. 1, 4 and 5, the backlight assembly 400A includes a light source part 410, a first light guide plate 421, a second light guide plate 422, a cover part 430 and a printed sheet 440.

The light source part 410 includes a printed circuit board 411, a plurality of light sources 412 and a first fixing portion 413.

The light source part 410 includes a first light source and a second light source. The first light source is disposed adjacent to the first light guide plate 421. The first light source generates light and transmits the light to the first light guide plate 421. The second light source is disposed adjacent to the second light guide plate 422. The second light source generates light and transmits the light to the second light guide plate 422.

The first light guide plate 421 is disposed in a direction opposite to the first direction D1 with respect to the light source part 410. The first light guide plate 421 faces the first light source. The first light guide plate 421 guides the light generated from the first light source to the display panel 100.

An upper surface of the first light guide plate 421 includes a first portion having a first height and a second portion having a second height lower than the first height. The second portion is adjacent to the first light source.

The second portion of the first light guide plate 421 includes an inclined portion having a height gradually decreasing as the inclined portion is closer to the first light source.

The second light source plate 422 is spaced apart from the first light guide plate 421. The second light guide plate 422 is disposed in the first direction D1 with respect to the light source part 410. The second light guide plate 422 faces the second light source. The second light guide plate 422 guides the light generated from the second light source to the display panel 100.

An upper surface of the second light guide plate 422 includes a first portion having the first height and a second portion having the second height lower than the first height. The second portion is adjacent to the second light source.

The second portion of the second light guide plate 422 includes an inclined portion having a height gradually decreasing as the inclined portion is closer to the second light source.

The cover part 430 is disposed over the light source part 410. The cover part 430 includes a portion overlapping with a portion of the first light guide plate 421 and a portion overlapping with a portion of the second light guide plate 422.

The cover part 430 is received in a recess portion defined by the second portion of the first light guide plate 421 and the second portion of the second light guide plate 422. For example, the inclined portions of the first and second light guide plates 421, 422 define the recess portion.

Side surfaces of the cover part 430 have a shape corresponding to the second portion of the first light guide plate 421 and the second portion of the second light guide plate 422. For example, a first side surface of the cover part 430 include a first inclined portion corresponding to the inclined portion of the first light guide plate 421. A second side surface of the cover part 430 includes a second inclined portion corresponding to the inclined portion of the second light guide plate 422.

The cover part 430 diffuses the light irradiated from the light source part 410 toward the first and second light guide plates 421 and 422. Alternatively or in addition, the cover part 430 diffuses the light irradiated from the light source part 410 toward the diffusion plate 300.

The printed sheet 440 is disposed between the light source part 410 and the cover part 430. The printed sheet 440 includes a portion overlapping with a portion of the first light guide plate 421 and a portion overlapping with a portion of the second light guide plate 422.

The printed sheet 440 has a shape corresponding to the second portion of the first light guide plate 421 and the second portion of the second light guide plate 422. For example, the printed sheet 440 includes a first inclined portion corresponding to the inclined portion of the first light guide plate 421, and a second inclined portion corresponding to the inclined portion of the second light guide plate 422.

According to an embodiment, the printed sheet 440 includes a third fixing portion 445 corresponding to the first fixing portion 413 of the light source part 410 and the second fixing portion 435 of the cover part 430. The third fixing portion 445 may be a hole combined with the first and second fixing portions 413 and 435 using a screw (not shown).

According to an embodiment, the printed sheet 440 adheres to the first and second light guide plates 421 and 422 with an adhesive element. Alternatively, the printed sheet 440 adheres to cover part 430 with an adhesive element.

The printed sheet 440 reflects and absorbs light transmitted from the light source part 410 through the cover part 430. As a result, the central portion of the display panel 100 corresponding to the light source part 410 does not appear relatively bright when compared with other portions of the display panel, so that a luminance uniformity of the display panel 100 may be improved.

The printed sheet 440 includes a film and patterns printed on the film.

The film may include a transparent element. For example, the film may include one of polyethyleneterephthalate ("PET"), PC, polyacrylate, polyethylenenaphtalate ("PEN") and triacetylcellulose ("TAC") or a mixture thereof. According to an embodiment, the film has a thickness between about 25 μm and about 250 μm.

Figure 6:
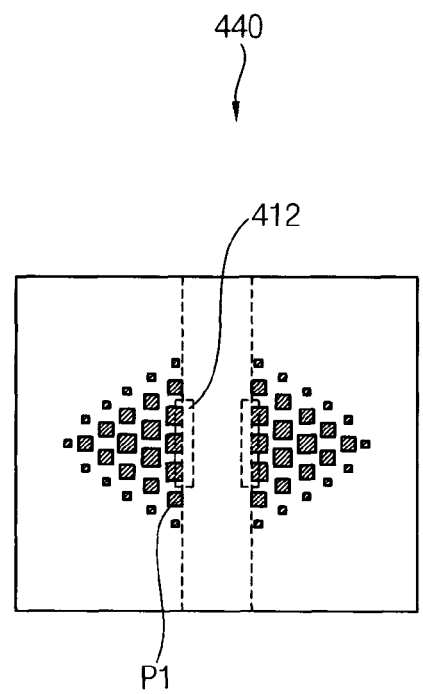
FIG. 6 is a plan view illustrating a portion of a printed sheet of FIG. 4.

The patterns of the printed sheet 440 are explained in further detail referring to FIG. 6.

FIG. 6 is a plan view illustrating a portion of the printed sheet 440 of FIG. 4.

Referring to FIGS. 4 to 6, the printed sheet 440 includes a film and patterns P1 printed on the film. The patterns P1 reflect and absorb light irradiated from the light source part 410.

According to an embodiment, the patterns P1 are concentrated at an area close to the first and second light sources 412. As shown in FIG. 6, a size of each of the patterns P1 decreases as the patterns P1 are farther away from the first and second light sources 412. Alternatively, a density of the patterns P1 having a uniform size may decrease as the patterns P1 are farther away from the first and second light sources 412. Also, according to an embodiment, the patterns may decrease in size and a density of the patterns may also decrease as the patterns are farther away from the light sources.

According to embodiments, the patterns P1 are printed in a half circular form, and are white, gray or black. A reflective ratio of the white patterns is between about 80% and about 100%. A reflective ratio of the gray patterns is between about 5% and about 90%. A reflective ratio of the black patterns is substantially equal to or less than about 5%.

According to an embodiment, the patterns P1 are foamed by an ink. The ink may include one of polyacrylate, polyester, PC, polyolefine, epoxy resin, polyurethane or a mixture thereof and organic or inorganic pigment. The patterns P1 have a thickness between about 25 μm and about 250 μm.

According to exemplary embodiments, the light source part 410 is disposed corresponding to the central portion of the display panel 100 so that the display apparatus may have a narrow bezel and be thin.

The cover part 430 diffusing light from the light source part 410 is disposed over the light source part 410 so that light may be prevented from leaking between the light source part 410 and the light guiding plate 420, and a luminance uniformity of the display panel 100 may be improved.

The printed sheet 440 reflecting and absorbing the light is disposed between the light source part 410 and the cover part 430 so that a luminance uniformity of the display panel 100 may be improved.

The second portion of the first light guide plate 421 and the second portion of the second light guide plate 422 define a recess portion, and the cover part 430 and the printed sheet 440 are received in the recess portion so that a thickness of the display apparatus is not increased by the cover part 430 and the printed sheet 440.

Figure 7:
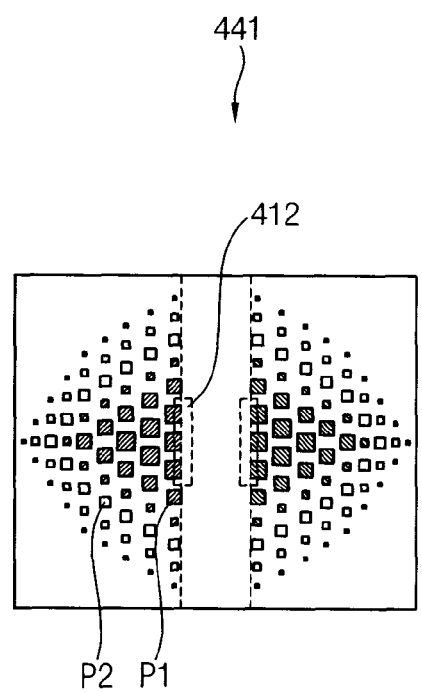
FIG. 7 is a plan view illustrating a portion of a printed sheet according to an exemplary embodiment of the present invention.

FIG. 7 is a plan view illustrating a portion of a printed sheet 441 according to an exemplary embodiment of the present invention.

A display apparatus according to the present exemplary embodiment is substantially the same as the display apparatus of the previous exemplary embodiment explained with reference to FIGS. 4 to 6 except for patterns of the printed sheet. Thus, the same reference numerals will be used to refer to the same or like parts as those described in the previous exemplary embodiment of FIGS. 4 to 6.

Referring to FIGS. 4, 5 and 7, the backlight assembly 400A includes a light source part 410, a first light guide plate 421, a second light guide plate 422, a cover part 430 and a printed sheet 441.

The printed sheet 441 is disposed between the light source part 410 and the cover part 430. The printed sheet 441 includes a portion overlapping with a portion of the first light guide plate 421 and a portion overlapping with a portion of the second light guide plate 422.

The printed sheet 441 reflects and absorbs the light transmitted from the light source part 410 through the cover part 430. Thus, the central portion of the display panel 100 corresponding to the light source part 410 is not relatively bright when compared to other portions of the display panel, so that a luminance uniformity of the display panel 100 may be improved.

The printed sheet 441 includes a film and patterns P1 and P2 printed on the film. The patterns P1 and P2 reflect and absorb light irradiated from the light source part 410.

The patterns P1 and P2 are concentrated at an area close to the first and second light sources 412. As shown in FIG. 7, a size of each of the patterns P1 and P2 decreases as the patterns P1 and P2 are farther away from the first and second light sources 412. Alternatively, a density of the patterns P1 and P2 having a uniform size decreases as the patterns P1 and P2 are farther away from the first and second light sources 412. Also, according to an embodiment, the patterns may decrease in size and a density of the patterns may also decrease as the patterns are farther away from the light sources.

The patterns P1 and P2 include a plurality of first patterns P1 disposed adjacent to the first and second light sources 412 and a plurality of second patterns P2 disposed farther than the first patterns P1 from the first and second light sources 412.

According to an embodiment, the first and second patterns P1, P2 are printed in a half circular form, and the second patterns P2 overlap with the first patterns P1.

The first patterns P1 have a first brightness, and the second patterns P2 have a second brightness. The first brightness is lower than the second brightness. For example, the first patterns P1 may be gray, and the second patterns P2 may be white.

The printed sheet 441 reflecting and absorbing the light is disposed between the light source part 410 and the cover part 430 so that a luminance uniformity of the display panel 100 may be improved.

In an area relatively close to the light sources 412, the luminance of the light from the light source part 410 is relatively high so that the first patterns P1 having the first brightness mainly absorb the light. In an area relatively far from the light sources 412, the luminance of the light is relatively low so that the second patterns P2 having the second brightness mainly reflect the light. As a result, a luminance uniformity of the display panel 100 may be improved.

The second portion of the first light guide plate 421 and the second portion of the second light guide plate 422 define a recess portion, and the cover part 430 and the printed sheet 441 are received in the recess portion so that a thickness of the display apparatus is not increased by the cover part 430 and the printed sheet 441.

Figure 8:
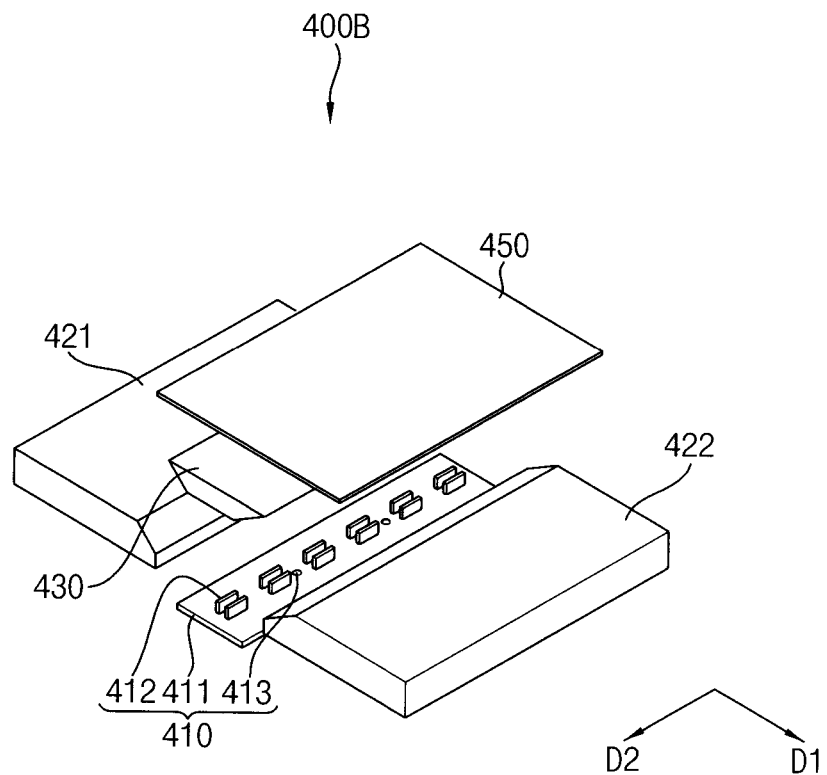
FIG. 8 is an exploded perspective view illustrating a backlight assembly according to an exemplary embodiment of the present invention.
Figure 9:
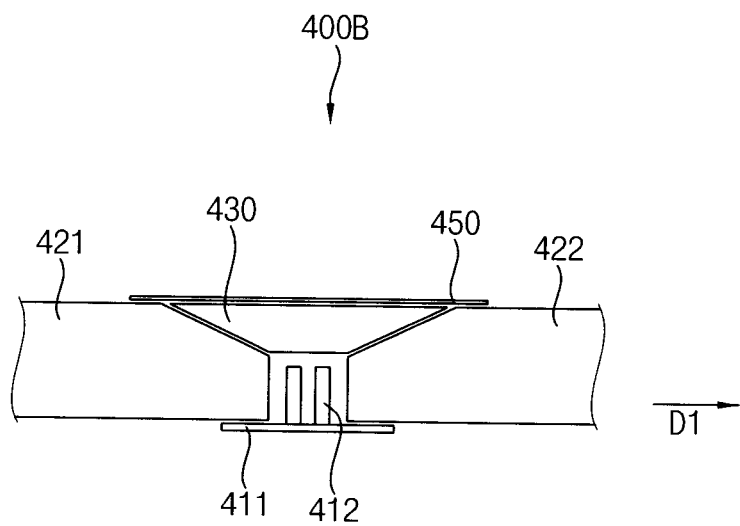
FIG. 9 is a cross-sectional view illustrating the backlight assembly of FIG. 8 taken along the first direction D1.

FIG. 8 is an exploded perspective view illustrating a backlight assembly 400B according to an exemplary embodiment of the present invention. FIG. 9 is a cross-sectional view illustrating the backlight assembly 400B of FIG. 8 taken along the first direction D1.

A display apparatus according to the present exemplary embodiment is substantially the same as the display apparatus of the previous exemplary embodiment explained in connection with FIGS. 1 to 3 except that the backlight assembly further includes a printed sheet. Thus, the same reference numerals will be used to refer to the same or like parts as those described in the previous exemplary embodiment of FIGS. 1 to 3.

Referring to FIGS. 1, 8 and 9, the backlight assembly 400B includes a light source part 410, a first light guide plate 421, a second light guide plate 422, a cover part 430 and a printed sheet 450.

The light source part 410 includes a printed circuit board 411, a plurality of light sources 412 and a first fixing portion 413.

The light source part 410 includes a first light source and a second light source. The first light source is disposed adjacent to the first light guide plate 421. The first light source generates light and transmits the light to the first light guide plate 421. The second light source is disposed adjacent to the second light guide plate 422. The second light source generates light and transmits the light to the second light guide plate 422.

The first light guide plate 421 is disposed in a direction opposite to the first direction D1 with respect to the light source part 410. The first light guide plate 421 faces the first light source. The first light guide plate 421 guides the light generated from the first light source to the display panel 100.

An upper surface of the first light guide plate 421 includes a first portion having a first height and a second portion having a second height lower than the first height. The second portion is adjacent to the first light source.

The second light source plate 422 is spaced apart from the first light guide plate 421. The second light guide plate 422 is disposed in the first direction D1 with respect to the light source part 410. The second light guide plate 422 faces the second light source. The second light guide plate 422 guides the light generated from the second light source to the display panel 100.

An upper surface of the second light guide plate 422 includes a first portion having the first height and a second portion having the second height lower than the first height. The second portion is adjacent to the second light source.

The cover part 430 is disposed over the light source part 410. The cover part 430 includes a portion overlapping with a portion of the first light guide plate 421 and a portion overlapping with a portion of the second light guide plate 422.

The cover part 430 is received in a recess portion defined by the second portion of the first light guide plate 421 and the second portion of the second light guide plate 422.

Side surfaces of the cover part 430 have a shape corresponding to the second portion of the first light guide plate 421 and the second portion of the second light guide plate 422.

The cover part 430 diffuses light irradiated from the light source part 410 toward the first and second light guide plates 421 and 422. Alternatively, or in addition, the cover part 430 may diffuse the light irradiated from the light source part 410 toward the diffusion plate 300.

The printed sheet 450 is disposed on the cover part 430. The printed sheet 450 includes a portion overlapping with a portion of the first light guide plate 421 and a portion overlapping with a portion of the second light guide plate 422.

The printed sheet 450 adheres to the first and second light guide plates 421 and 422 with an adhesive element. Alternatively, the printed sheet 450 adheres to the cover part 430 with an adhesive element. Alternatively, the printed sheet 450 adheres to the diffusion plate 300 with an adhesive element.

The printed sheet 450 reflects and absorbs light passing through the cover part 430. Thus, the central portion of the display panel 100 corresponding to the light source part 410 is not relatively bright when compared to other portions of the display panel, so that a luminance uniformity of the display panel 100 may be improved.

The printed sheet 450 includes patterns substantially the same as the patterns P1 shown in FIG. 6. Alternatively, the printed sheet 450 includes patterns substantially the same as the patterns P1 and P2 shown in FIG. 7.

Referring to FIG. 6, the printed sheet 450 may include the film and the patterns P1 printed on the film. The patterns P1 reflect and absorb light passing through the cover part 430.

The patterns P1 may be concentrated at an area close to the first and second light sources 412. As shown in FIG. 6, a size of each of the patterns P1 decreases as the patterns P1 are farther away from the first and second light sources 412. Alternatively, a density of the patterns P1 having a uniform size decreases as the patterns P1 are farther away from the first and second light sources 412. Also, according to an embodiment, the patterns may decrease in size and a density of the patterns may also decrease as the patterns are farther away from the light sources.

Referring to FIG. 7, the printed sheet 450 may include a film and patterns P1 and P2 printed on the film. The patterns P1 and P2 reflect and absorb light passing through the cover part 430.

The patterns P1 and P2 may be concentrated at an area close to the first and second light sources 412. As shown in FIG. 7, a size of each of the patterns P1 and P2 decreases as the patterns P1 and P2 are farther away from the first and second light sources 412. Alternatively, a density of the patterns P1 and P2 having a uniform size decreases as the patterns P1 and P2 are farther away from the first and second light sources 412. Also, according to an embodiment, the patterns may decrease in size and a density of the patterns may also decrease as the patterns are farther away from the light sources.

The patterns P1 and P2 include a plurality of first patterns P1 disposed adjacent to the first and second light sources 412 and a plurality of second patterns P2 disposed farther than the first patterns from the first and second light sources 412.

The first patterns P1 have a first brightness, and the second patterns P2 have a second brightness. The first brightness is lower than the second brightness. For example, the first patterns P1 may be gray, and the second patterns P2 may be white.

The printed sheet 450 reflecting and absorbing the light is disposed on the cover part 430 so that a luminance uniformity of the display panel 100 may be improved.

The second portion of the first light guide plate 421 and the second portion of the second light guide plate 422 define a recess portion, and the cover part 430 is received in the recess portion so that a thickness of the display apparatus is not increased by the cover part 430.

Figure 10:
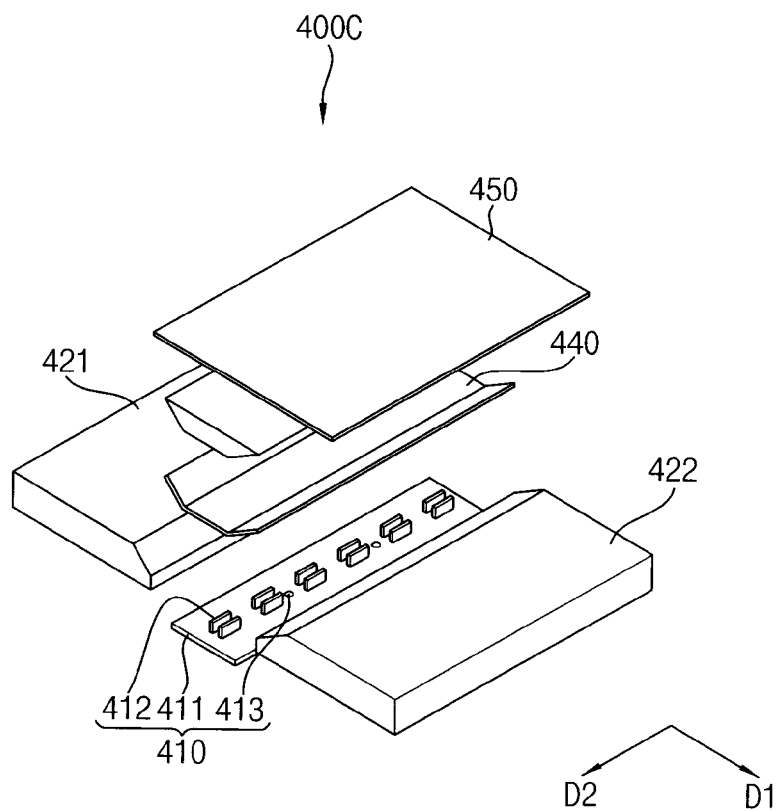
FIG. 10 is an exploded perspective view illustrating a backlight assembly according to an exemplary embodiment of the present invention.
Figure 11:
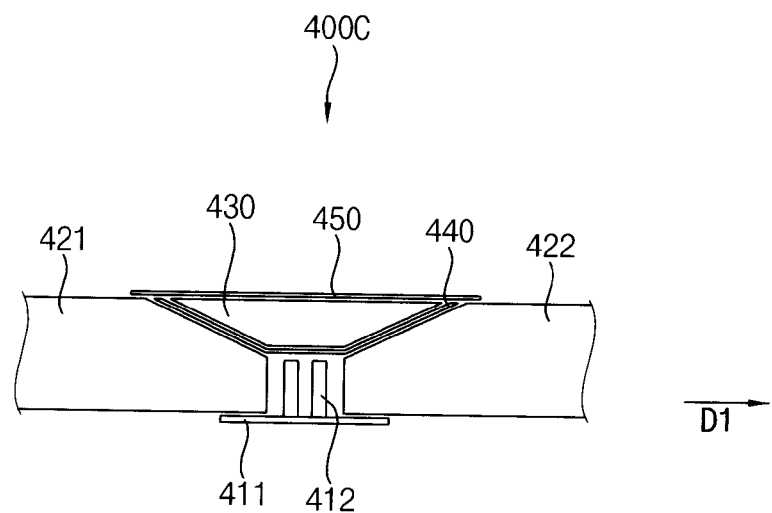
FIG. 11 is a cross-sectional view illustrating the backlight assembly of FIG. 10 taken along the first direction D1.

FIG. 10 is an exploded perspective view illustrating a backlight assembly 400C according to an exemplary embodiment of the present invention. FIG. 11 is a cross-sectional view illustrating the backlight assembly 400C of FIG. 10 taken along the first direction D1.

A display apparatus according to the present exemplary embodiment is substantially the same as the display apparatus of the previous exemplary embodiment explained referring to FIGS. 1 to 3 except that the backlight assembly further includes first and second printed sheets. Thus, the same reference numerals will be used to refer to the same or like parts as those described in the previous exemplary embodiment of FIGS. 1 to 3.

Referring to FIGS. 1, 10 and 11, the backlight assembly 400C includes a light source part 410, a first light guide plate 421, a second light guide plate 422, a cover part 430, a first printed sheet 440 and a second printed sheet 450.

The light source part 410 includes a printed circuit board 411, a plurality of light sources 412 and a first fixing portion 413.

The light source part 410 includes a first light source and a second light source. The first light source is disposed adjacent to the first light guide plate 421. The first light source generates light and transmits the light to the first light guide plate 421. The second light source is disposed adjacent to the second light guide plate 422. The second light source generates light and transmits the light to the second light guide plate 422.

The first light guide plate 421 is disposed in a direction opposite to the first direction D1 with respect to the light source part 410. The first light guide plate 421 faces the first light source. The first light guide plate 421 guides the light generated from the first light source to the display panel 100.

An upper surface of the first light guide plate 421 includes a first portion having a first height and a second portion having a second height lower than the first height. The second portion is adjacent to the first light source.

The second light source plate 422 is spaced apart from the first light guide plate 421. The second light guide plate 422 is disposed in the first direction D1 with respect to the light source part 410. The second light guide plate 422 faces the second light source. The second light guide plate 422 guides the light generated from the second light source to the display panel 100.

An upper surface of the second light guide plate 422 includes a first portion having the first height and a second portion having the second height lower than the first height. The second portion is adjacent to the second light source.

The cover part 430 is disposed over the light source part 410. The cover part 430 includes a portion overlapping with a portion of the first light guide plate 421 and a portion overlapping with a portion of the second light guide plate 422.

The cover part 430 is received in a recess portion defined by the second portion of the first light guide plate 421 and the second portion of the second light guide plate 422.

Side surfaces of the cover part 430 have a shape corresponding to the second portion of the first light guide plate 421 and the second portion of the second light guide plate 422.

The cover part 430 diffuses the light irradiated from the light source part 410 toward the first and second light guide plates 421 and 422. Alternatively, or in addition, the cover part 430 diffuses the light irradiated from the light source part 410 toward the diffusion plate 300.

The first printed sheet 440 is disposed between the light source part 410 and the cover part 430. The first printed sheet 440 includes a portion overlapping with a portion of the first light guide plate 421 and a portion overlapping with a portion of the second light guide plate 422.

The first printed sheet 440 has a shape corresponding to the second portion of the first light guide plate 421 and the second portion of the second light guide plate 422.

The first printed sheet 440 reflects and absorbs the light transmitted from the light source part 410 through the cover part 430. Thus, the central portion of the display panel 100 corresponding to the light source part 410 does not appear relatively bright as compared to other portions of the display panel, so that a luminance uniformity of the display panel 100 may be improved.

The first printed sheet 440 may include patterns substantially same as the patterns P1 shown in FIG. 6. Alternatively, the first printed sheet 440 may include patterns substantially same as the patterns P1 and P2 shown in FIG. 7.

The second printed sheet 450 is disposed on the cover part 430. The second printed sheet 450 includes a portion overlapping with a portion of the first light guide plate 421 and a portion overlapping with a portion of the second light guide plate 422.

The second printed sheet 450 reflects and absorbs the light passing through the cover part 430. Thus, the central portion of the display panel 100 corresponding to the light source part 410 does not appear relatively bright as compared to other portions of the display panel, so that a luminance uniformity of the display panel 100 may be improved.

The second printed sheet 450 may include patterns substantially same as the patterns P1 shown in FIG. 6. Alternatively, the second printed sheet 450 may include patterns substantially same as the patterns P1 and P2 shown in FIG. 7.

According to an embodiment, the patterns of the first printed sheet 440 include gray patterns and white patterns, and the patterns of the second printed sheet 450 include white patterns.

The first printed sheet 440 reflecting and absorbing the light is disposed between the light source part 410 and the cover part 430 and the second printed sheet 450 reflecting and absorbing the light is disposed on the cover part 430 so that a luminance uniformity of the display panel 100 may be improved.

The second portion of the first light guide plate 421 and the second portion of the second light guide plate 422 define a recess portion, and the cover part 430 and the first printed sheet 440 are received in the recess portion so that a thickness of the display apparatus is not increased by the cover part 430 and the first printed sheet 440.

Figure 12:
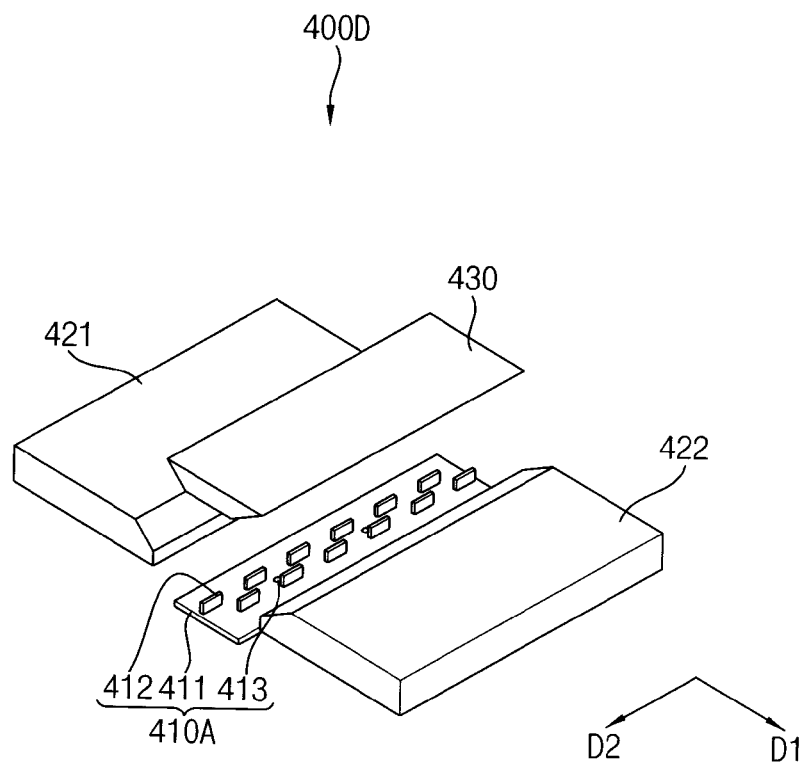
FIG. 12 is an exploded perspective view illustrating a backlight assembly according to an exemplary embodiment of the present invention.
Figure 13A:
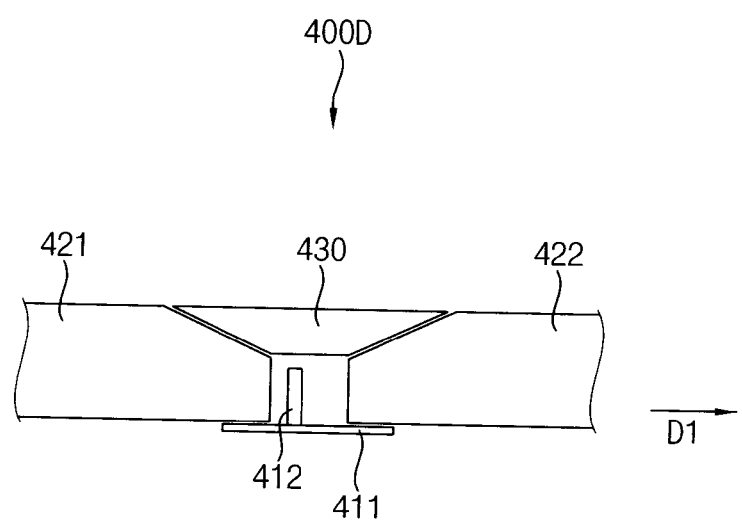
FIGS. 13A and 13B are cross-sectional views illustrating the backlight assembly of FIG. 12 taken along the first direction D1.
Figure 13B:
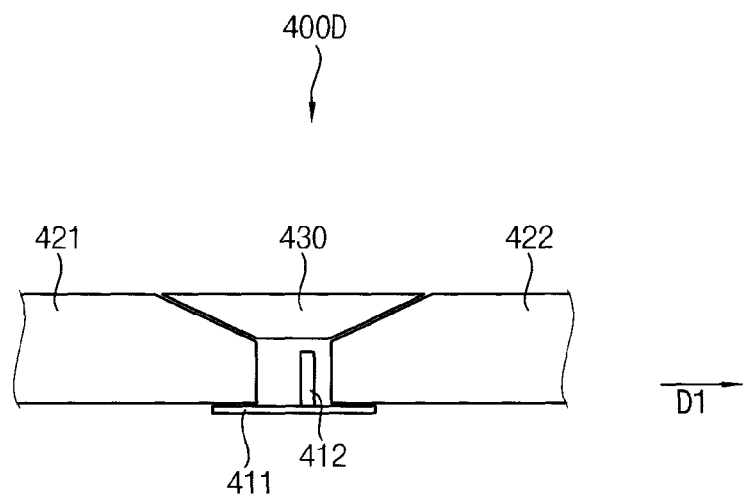

FIG. 12 is an exploded perspective view illustrating a backlight assembly 400D according to an exemplary embodiment of the present invention. FIGS. 13A and 13B are cross-sectional views illustrating the backlight assembly 400D of FIG. 12 taken along the first direction.

A display apparatus according to the present exemplary embodiment is substantially the same as the display apparatus of the previous exemplary embodiment explained referring to FIGS. 1 to 3 except for a light source part of the backlight assembly. Thus, the same reference numerals will be used to refer to the same or like parts as those described in the previous exemplary embodiment of FIGS. 1 to 3.

Referring to FIGS. 1, 12, 13A and 13B, the backlight assembly 400D includes a light source part 410A, a first light guide plate 421, a second light guide plate 422 and a cover part 430.

The light source part 410A includes a printed circuit board 411, a plurality of light sources 412 and a first fixing portion 413.

The light sources 412 are fixed to the printed circuit board 411. The printed circuit board 411 includes wiring applying a driving signal to the light sources 412.

The light source part 410A includes a first light source and a second light source. The first light source is disposed adjacent to the first light guide plate 421. The first light source generates light and transmits the light to the first light guide plate 421. The second light source is disposed adjacent to the second light guide plate 422. The second light source generates light and transmits the light to the second light guide plate 422.

The light sources 412 are disposed in a plurality of rows. For example, the light sources 412 are disposed in two rows.

The light sources 412 are disposed in two rows along the second direction D2. The first light source is disposed in a first row. The second light source is disposed in a second row substantially parallel to the first row. The light sources 412 protruded from the printed circuit board 411 in a direction substantially perpendicular to a plane of the printed circuit board 411.

The first light source includes a plurality of first point light sources. The second light source includes a plurality of second point light sources. Each of the first point light sources and each of the second point light sources are alternately disposed with each other along the second direction D2 so that the first point light sources do not face the second point light sources.

FIG. 13A shows a first point light source of the backlight assembly 400D. FIG. 13B shows a second point light source of the backlight assembly 400D.

The first light guide plate 421 is disposed in a direction opposite to the first direction D1 with respect to the light source part 410A. The first light guide plate 421 faces the first light source. The first light guide plate 421 guides the light generated from the first light source to the display panel 100.

An upper surface of the first light guide plate 421 includes a first portion having a first height and a second portion having a second height lower than the first height. The second portion is adjacent to the first light source.

The second light source plate 422 is spaced apart from the first light guide plate 421. The second light guide plate 422 is disposed in the first direction D1 with respect to the light source part 410A. The second light guide plate 422 faces the second light source. The second light guide plate 422 guides the light generated from the second light source to the display panel 100.

An upper surface of the second light guide plate 422 includes a first portion having the first height and a second portion having the second height lower than the first height. The second portion is adjacent to the second light source.

The cover part 430 is disposed over the light source part 410A. The cover part 430 includes a portion overlapping with a portion of the first light guide plate 421 and a portion overlapping with a portion of the second light guide plate 422.

The cover part 430 is received in a recess portion defined by the second portion of the first light guide plate 421 and the second portion of the second light guide plate 422.

A height of an upper surface of the cover part 430 is substantially equal to or lower than the first height. Thus, the upper surface of the cover part 430 does not protrude from the upper surfaces of the first and second light guide plates 421 and 422. Therefore, a thickness of the backlight assembly 400D is not increased by the cover part 430.

The cover part 430 diffuses the light irradiated from the light source part 410A toward the first and second light guide plates 421 and 422. Alternatively, or in addition, the cover part 430 may diffuse the light irradiated from the light source part 410A toward the diffusion plate 300. Thus, the central portion of the display panel 100 corresponding to the light source part 410A does not appear relatively bright as compared to other portions of the display panel, so that a luminance uniformity of the display panel 100 may be improved.

According to an embodiment, the backlight assembly 400D further includes a printed sheet 442. The printed sheet 442 is disposed between the light source part 410A and the cover part 430 as shown in FIG. 4, or on the cover part 430 as shown in FIG. 8. According to an embodiment, the backlight assembly 400D includes a first printed sheet disposed between the light source part 410A and the cover part 430 and a second printed sheet disposed on the cover part 430 as shown in FIG. 10.

Figure 14:
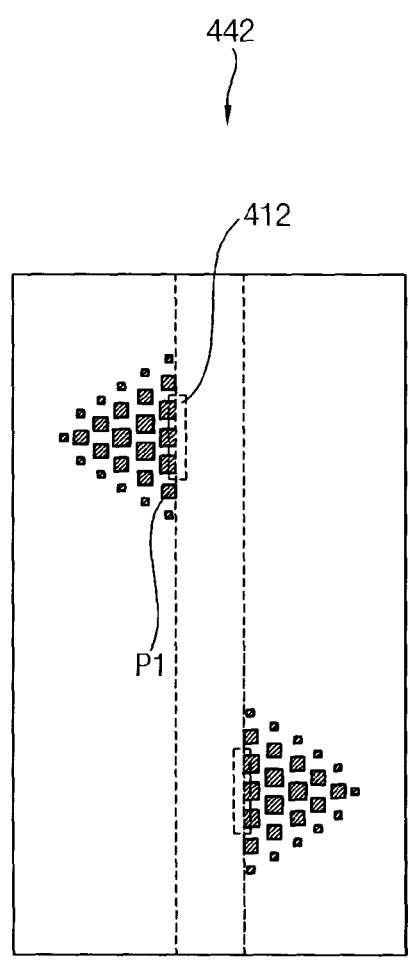
FIG. 14 is a plan view illustrating a portion of a printed sheet included in the backlight assembly of FIG. 12.

FIG. 14 is a plan view illustrating a portion of the printed sheet 442 included in the backlight assembly 400D of FIG. 12.

Referring to FIGS. 12 to 14, the printed sheet 442 includes a film and patterns P1 printed on the film. The patterns P1 reflect and absorb the light irradiated from the light source part 410A.

The patterns P1 are formed corresponding to an area at which the first and second light sources 412 are disposed. Thus, a first group of the patterns P1 corresponding to the first light source and a second group of the patterns P1 corresponding to the second light source are alternately disposed with each other along the second direction D2.

According to an embodiment, the patterns P1 are concentrated at an area close to the first and second light sources 412. According to an embodiment, a size of each of the patterns P1 decreases as the patterns P1 are farther away from the first and second light sources 412. Alternatively, a density of the patterns P1 having a uniform size may decrease as the patterns P1 are farther away from the first and second light sources 412. Also, according to an embodiment, the patterns may decrease in size and a density of the patterns may also decrease as the patterns are farther away from the light sources.

Each of the first point light sources and each of the second point light sources are alternately disposed with each other so that a light from the light source part 410A is dispersed. Thus, a luminance uniformity of the display panel 100 may be improved.

The cover part 430 diffusing a light from the light source part 410A is disposed over the light source part 410A so that a light may be prevented from leaking between the light source part 410A and the light guiding plate 420, and a luminance uniformity of the display panel 100 may be improved.

The backlight assembly 400D includes the printed sheet 442 reflecting and absorbing the light from the light source part 410A so that a luminance uniformity of the display panel 100 may be improved.

The second portion of the first light guide plate 421 and the second portion of the second light guide plate 422 define a recess portion, and the cover part 430 is received in the recess portion so that a thickness of the display apparatus is not increased by the cover part 430.

Figure 15:
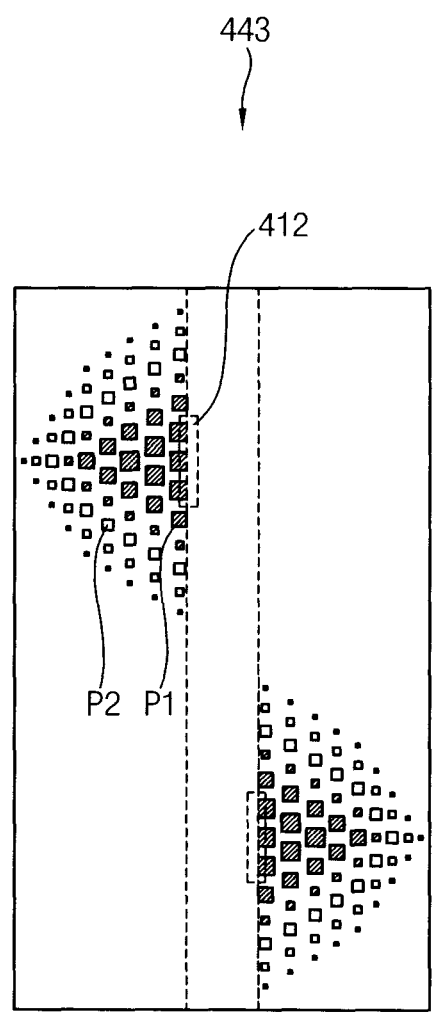
FIG. 15 is a plan view illustrating a portion of a printed sheet according to an exemplary embodiment of the present invention.

FIG. 15 is a plan view illustrating a portion of a printed sheet 443 according to an exemplary embodiment of the present invention.

A display apparatus according to the present exemplary embodiment is substantially the same as the display apparatus of the previous exemplary embodiment explained with respect to FIGS. 12 to 14 except for patterns of the printed sheet. Thus, the same reference numerals will be used to refer to the same or like parts as those described in the previous exemplary embodiment of FIGS. 12 to 14.

Referring to FIGS. 12, 13A, 13B and 15, the backlight assembly 400D includes a light source part 410, a first light guide plate 421, a second light guide plate 422 and a cover part 430.

According to an embodiment, the backlight assembly 400D further includes a printed sheet 443. The printed sheet 443 is disposed between the light source part 410A and the cover part 430 as shown in FIG. 4. Alternatively, the printed sheet 443 may be disposed on the cover part 430 as shown in FIG. 8. According to an embodiment, the backlight assembly 400D includes a first printed sheet disposed between the light source part 410A and the cover part 430 and a second printed sheet disposed on the cover part 430 as shown in FIG. 10.

The printed sheet 443 includes the film and the patterns P1 and P2 printed on the film. The patterns P1 and P2 reflect and absorb the light irradiated from the light source part 410A.

The patterns P1 and P2 are formed corresponding to an area at which the first and second light sources 412 are disposed. Thus, a first group of the patterns P1 and P2 corresponding to the first light source and a second group of the patterns P1 and P2 corresponding to the second light source are alternately disposed with each other along the second direction D2.

According to an embodiment, the patterns P1 and P2 are concentrated at an area close to the first and second light sources 412. According to an embodiment, a size of each of the patterns P1 and P2 decreases as the patterns P1 and P2 are farther away from the first and second light sources 412. Alternatively, a density of the patterns P1 and P2 having a uniform size decreases as the patterns P1 and P2 are farther away from the first and second light sources 412.

The patterns P1 and P2 include a plurality of first patterns P1 disposed adjacent to the first and second light sources 412 and a plurality of second patterns P2 disposed farther than the first patterns P1 from the first and second light sources 412.

According to an embodiment, the first patterns P1 have a first brightness, and the second patterns P2 have a second brightness. The first brightness is lower than the second brightness. For example, the first patterns P1 may be gray, and the second patterns P2 may be white.

Each of the first point light sources and each of the second point light sources are alternately disposed with each other so that a light from the light source part 410A is dispersed. Thus, a luminance uniformity of the display panel 100 may be improved.

The cover part 430 diffusing light from the light source part 410A is disposed over the light source part 410A so that a light may be prevented from leaking between the light source part 410A and the light guiding plate 420, and a luminance uniformity of the display panel 100 may be improved.

According to an embodiment, the backlight assembly 400D includes the printed sheet 443 reflecting and absorbing the light from the light source part 410A so that a luminance uniformity of the display panel 100 may be improved.

In an area relatively close to the light sources 412, the luminance of the light is relatively high so that the first patterns P1 having the first brightness mainly absorb the light. In an area relatively far from the light sources 412, the luminance of the light is relatively low so that the second patterns P2 having the second brightness mainly reflect the light. Thus, a luminance uniformity of the display panel 100 may be improved.

The second portion of the first light guide plate 421 and the second portion of the second light guide plate 422 define a recess portion, and the cover part 430 is received in the recess portion so that a thickness of the display apparatus is not increased by the cover part 430.

According to the embodiments of the present invention as explained above, the light source part is disposed corresponding to the central portion of the display panel so that the display apparatus may have a narrow bezel and a thin thickness.

The cover part diffusing light from the light source part is disposed over the light source part so that the light may be prevented from leaking between the light source part and the light guide plates, and a luminance uniformity of the display panel may be improved.

The printed sheets reflecting and absorbing the light are disposed over the light source part so that a luminance uniformity of the display panel may be improved.

The foregoing is illustrative of the embodiments of the present invention and is not to be construed as limiting thereof. Although a few exemplary embodiments of the present invention have been described, those skilled in the art will readily appreciate that modifications are possible in the exemplary embodiments, and are intended to be included within the scope of the appended claims.

What is claimed is:

1. A backlight assembly comprising:
a first light guide plate, wherein the first light guide plate comprises a first inclined portion;
a second light guide plate spaced apart from the first light guide plate, wherein the second light guide plate comprises a second inclined portion, and wherein the first and second inclined portions form an inclined recess;
a light source part disposed between the first light guide plate and the second light guide plate, and including a first light source configured to provide light to the first light guide plate; and a second light source configured to provide light to the second light guide plate;
a cover part disposed over the light source part, and overlapping with a portion of the first light guide plate and a portion of the second light guide plate,
wherein the cover part includes:
a first inclined side surface facing the first inclined portion of the first light guide plate;
a second inclined side surface facing the second inclined portion of the second light guide plate;
a lower surface connecting a first end of the first inclined surface and a first end of the second inclined surface and disposed over the first light source and the second light source; and
an upper surface connecting a second end of the first inclined surface and a second end of the second inclined surface and facing the lower surface.

2. The backlight assembly of claim 1, wherein:
an upper surface of the first light guide plate includes a first portion having a first height and a second portion having a second height less than the first height, the second portion being adjacent to the first light source, and
an upper surface of the second light guide plate includes a first portion having the first height, and a second portion having the second height less than the first height, the second portion of the second light guide plate being adjacent to the second light source.

3. The backlight assembly of claim 2, wherein:
the second portion of the first light guide plate includes the first inclined portion having a height gradually decreasing as the first inclined portion of the first light guide plate gets closer to the first light source, and
the second portion of the second light guide plate includes the second inclined portion having a height gradually decreasing as the second inclined portion of the second light guide plate gets closer to the second light source.

4. The backlight assembly of claim 2, wherein a height of the upper surface of the cover part is substantially equal to or less than the first height.

5. The backlight assembly of claim 2, wherein a width of the upper surface of the cover part is substantially equal to or less than a distance of a gap between a boundary of the first and second portions of the first light guide plate and a boundary of the first and second portions of the second light guide plate.

6. The backlight assembly of claim 2, wherein side surfaces of the cover part have a shape corresponding to the second portion of the first light guide plate and to the second portion of the second light guide plate, respectively.

7. The backlight assembly of claim 1, further comprising a printed sheet disposed between the light source part and the cover part, and wherein the printed. sheet includes printed patterns on the printed sheet, 8. The backlight assembly of claim 7, wherein a size of each of the printed patterns or a density of the printed patterns decreases as a distance of the printed patterns from the first and second light sources increases.

9. The backlight assembly of claim 7, wherein the printed patterns include first patterns having a first brightness and second patterns having a second brightness, and
the second patterns are disposed farther than the first patterns from the first and second light sources 10. The backlight assembly of claim 9, Wherein the first brightness is less than the second brightness, 11. The backlight assembly of claim 10, wherein the first patterns are gray and the second patterns are white.

12. The backlight assembly of claim 1, further comprising a second printed sheet disposed on a top portion of the cover part and including printed patterns on the second printed sheet, 13. The backlight assembly of claim 12, wherein a size of each of the printed patterns or a density of the printed patterns decreases as a distance of the printed patterns from the first and second light sources increases.

14. The backlight assembly of claim 12, wherein the printed patterns include first patterns having a first brightness and second patterns having a second brightness, and
the second patterns are disposed farther than the first patterns from the first and second light sources.

15. The backlight assembly of claim 14, wherein the first brightness is less than the second brightness.

16. The backlight assembly of claim 15, wherein the first patterns are gray and the second patterns are white.

17. The backlight assembly of claim 1, wherein the cover part includes a material that diffuses light.

18. The backlight assembly of claim I, wherein a surface of the cover part has a concavo-convex pattern.

19. The backlight assembly of claim 1., Wherein the first light source includes a plurality of first point light sources disposed in a first row, and
the second light source includes a plurality of second point light sources disposed in a second row substantially parallel with the first row.

20. The backlight assembly of claim 19, wherein the first point light sources respectively face the second point light sources.

21. The backlight assembly of claim 19, wherein each of the first point light sources and each of the second point light sources are alternately disposed with each other.

22. The backlight assembly of claim 1, wherein:
the light source part further includes a printed circuit board on which the first light source and the second light source are fixed,
the printed circuit board includes a first fixing portion,
the cover part includes a second fixing portion, and
the cover part is fixed at the light source part by the first and second fixing portions.

23. The backlight assembly of claim 22, wherein:
the first fixing portion is a hole,
the second fixing portion is a protrusion extending toward the printed circuit board, and the first fixing portion is combined with the second fixing portion by a screw.

24. A display apparatus comprising:
a display panel; and
a backlight assembly disposed under the display panel, and including a first light guide plate comprising a first inclined portion, a second light guide plate comprising a second inclined portion, wherein the first and second inclined portions form an inclined recess, a light source part and a cover part, the second light guide plate being spaced apart from the first light guide plate, the light source part being disposed between the first light guide plate and the second light guide plate and including a first light source configured to provide light to the first light guide plate and a second light source configured to provide light to the second light guide plate, the cover part being disposed over the light source part and overlapping with a portion of the first light guide plate and a portion of the second light guide plate,
wherein the cover part is received in the inclined recess, and
wherein the cover part includes;
a first inclined side surface facing the first inclined portion of the first light guide plate;
a second inclined side surface facing the second inclined portion of the second light guide plate;
a lower surface connecting a first end of the first inclined surface and a first end of the second inclined surface and disposed over the first light source and the second light source; and
an upper surface connecting a second end of the first inclined surface and a second end of the second inclined surface and facing the lower surface.

25. The display apparatus of claim 24, wherein an upper surface of the first light guide plate includes a first portion having a first height, and a. second portion having a second height less than the first height, and the second portion being adjacent to the first light source, and
an upper surface of the second light guide plate includes a first portion having the first height, and a second portion having the second height less than the first height, and the second portion of the second light guide plate being adjacent to the second light source.

26. The display apparatus of claim 25, wherein the second portion of the first light guide plate includes the first inclined portion having a height gradually decreasing as the first inclined portion of the first light guide plate gets closer to the first light source, and
the second portion of the second light guide plate includes the second inclined portion having a height gradually decreasing as the second inclined portion of the second light guide plate gets closer to the second light source.

27. The display apparatus of claim 25, wherein a height of the upper surface of the cover part is substantially equal to or less than the first height.

28. The display apparatus of claim 25, wherein a width of the upper surface of the cover part is substantially equal to or less than a distance of a gap between a boundary of the first and second portions of the first light guide plate and a boundary of the first and second portions of the second light guide plate.

29. The display apparatus of claim 25, wherein side surfaces of the cover part have a shape corresponding to the second portion of the first light guide plate and the second portion of the second light guide plate, respectively, 30. The display apparatus of claim 24, wherein the backlight assembly further comprises a printed sheet disposed between the light source part and the cover part, and wherein the printed sheet includes printed patterns on the printed sheet 31. The display apparatus of claim 30, wherein a size of each of the printed patterns or a density of the printed patterns decreases as a distance of the printed patterns from the first and second light sources increases.

32. The display apparatus of claim 24, wherein the backlight assembly further comprises a second printed sheet disposed on a top portion of the cover part and including printed patterns on the second printed sheet.

33. The display apparatus of claim 32, wherein a size of each of the printed patterns or a density of the printed patterns decreases as a distance of the printed patterns from the first and second light sources increases.

34. A backlight assembly comprising:
a first light guide plate, wherein the first light guide plate comprises a first inclined portion;
a second light guide plate spaced apart from the first light guide plate, wherein the second light guide plate comprises a second inclined portion, and wherein the first and second inclined portions form an inclined recess;
a light source disposed between the first light guide plate and the second light guide plate and configured to provide light toward both the first light guide plate and the second light guide plate;
a cover part disposed over the light source, and overlapping with a portion of the first light guide plate and a portion of the second light guide plate, wherein the cover part diffuses light from the light source, and
wherein the cover part includes:
a first inclined side surface facing the first inclined portion of the first light guide plate;
a second inclined side surface facing the second inclined portion of the second light guide plate;
a lower surface connecting a first end of the first inclined surface and a first end of the second inclined surface and disposed over the first light source and the second light source; and
an upper surface connecting, a second end of the first inclined surface and a second end of the second inclined surface and facing the lower surface.

35. The backlight assembly of claim 34, wherein the upper surface of the cover part is substantially level with or Mow a top surface of each of the first and second light guide plates.

36. The backlight assembly of claim 34, further comprising a printed sheet including patterns for absorbing and reflecting light.

37. The backlight assembly of claim 36, wherein the printed sheet is positioned between the cover part and the light source.

38. The backlight assembly of claim 36, wherein a second printed sheet is positioned on the upper surface of the cover part.

* * * * *